Sept. 7, 1926.
C. D. VOUGHT
MOLDING MACHINE
1,599,151
Original Filed July 1, 1924    4 Sheets-Sheet 1
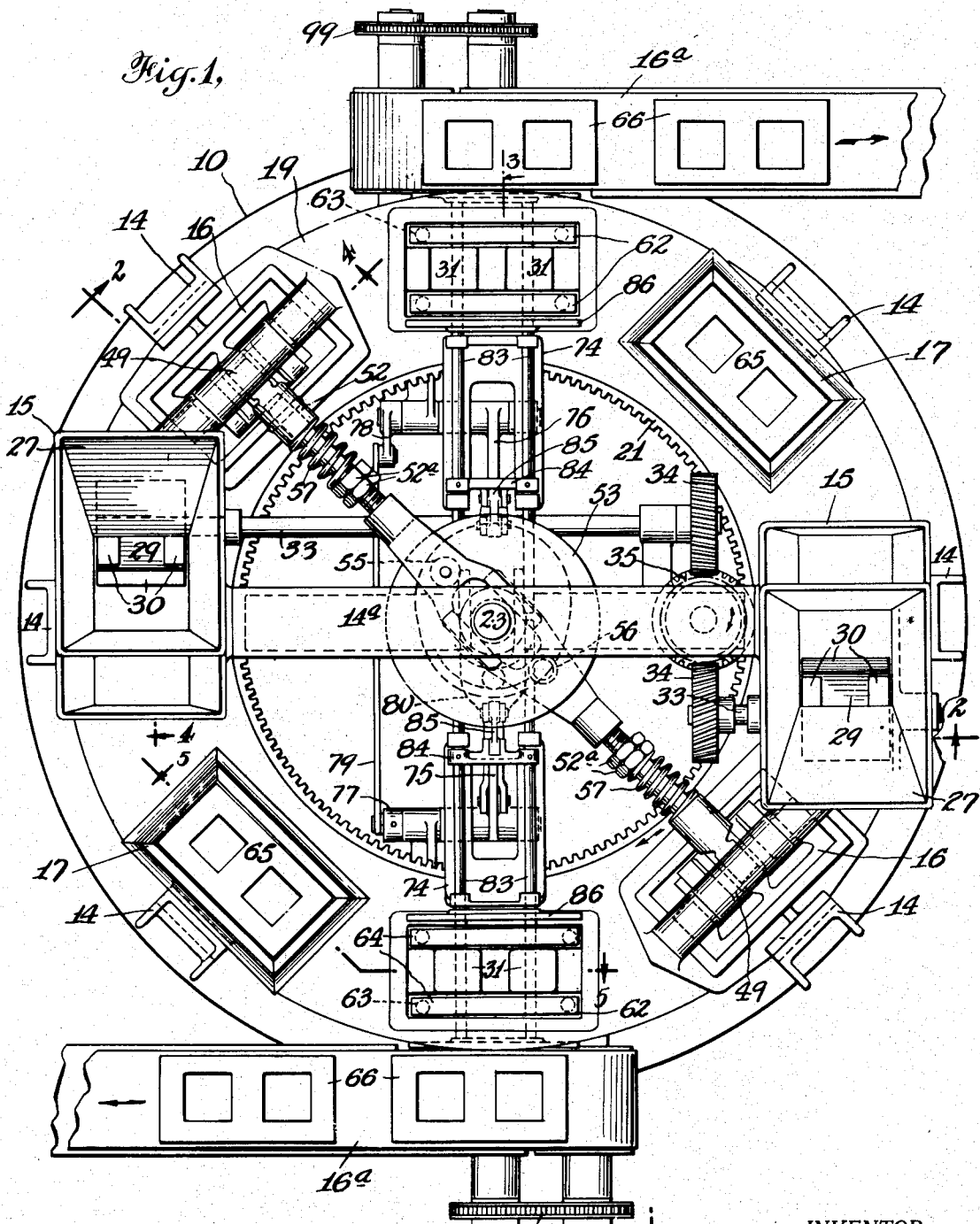
Fig.1,
INVENTOR
Chauncey D. Vought
BY
Howard E. Thompson
ATTORNEY Sept. 7, 1926.
C. D. VOUGHT
1,599,151
MOLDING MACHINE
Original Filed July 1, 1924     4 Sheets-Sheet 2
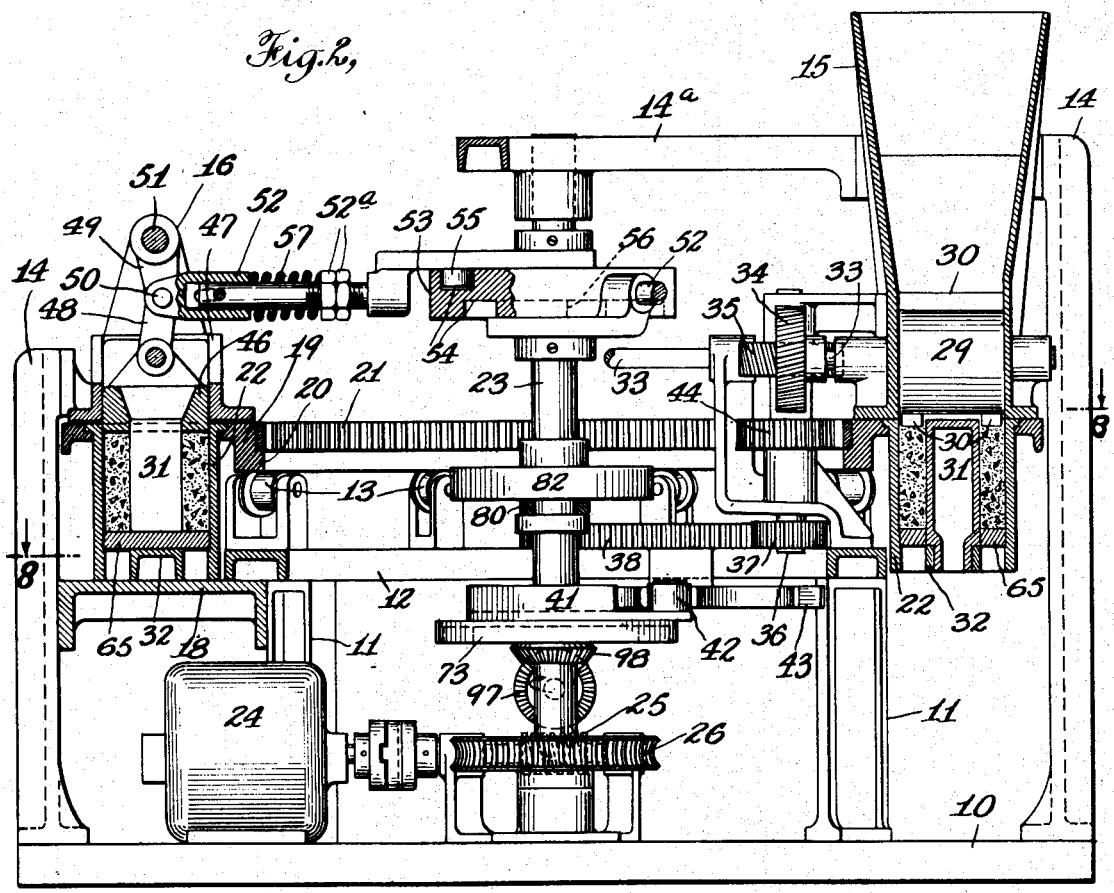
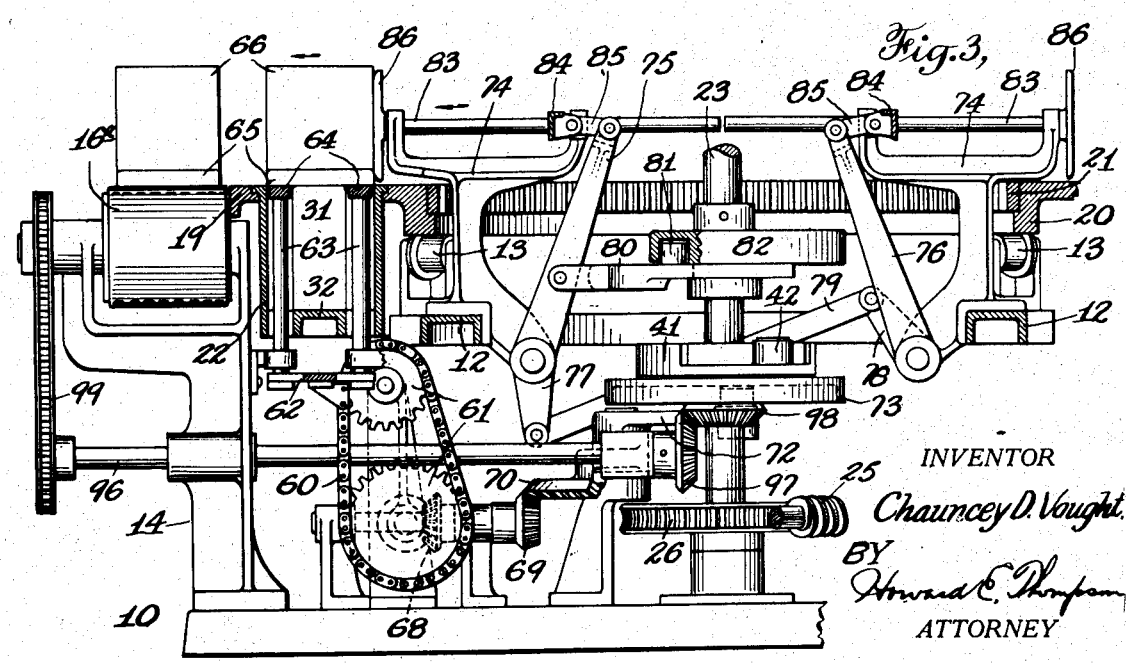
INVENTOR
Chauncey D. Vought
BY
Howard E. Thompson
ATTORNEY

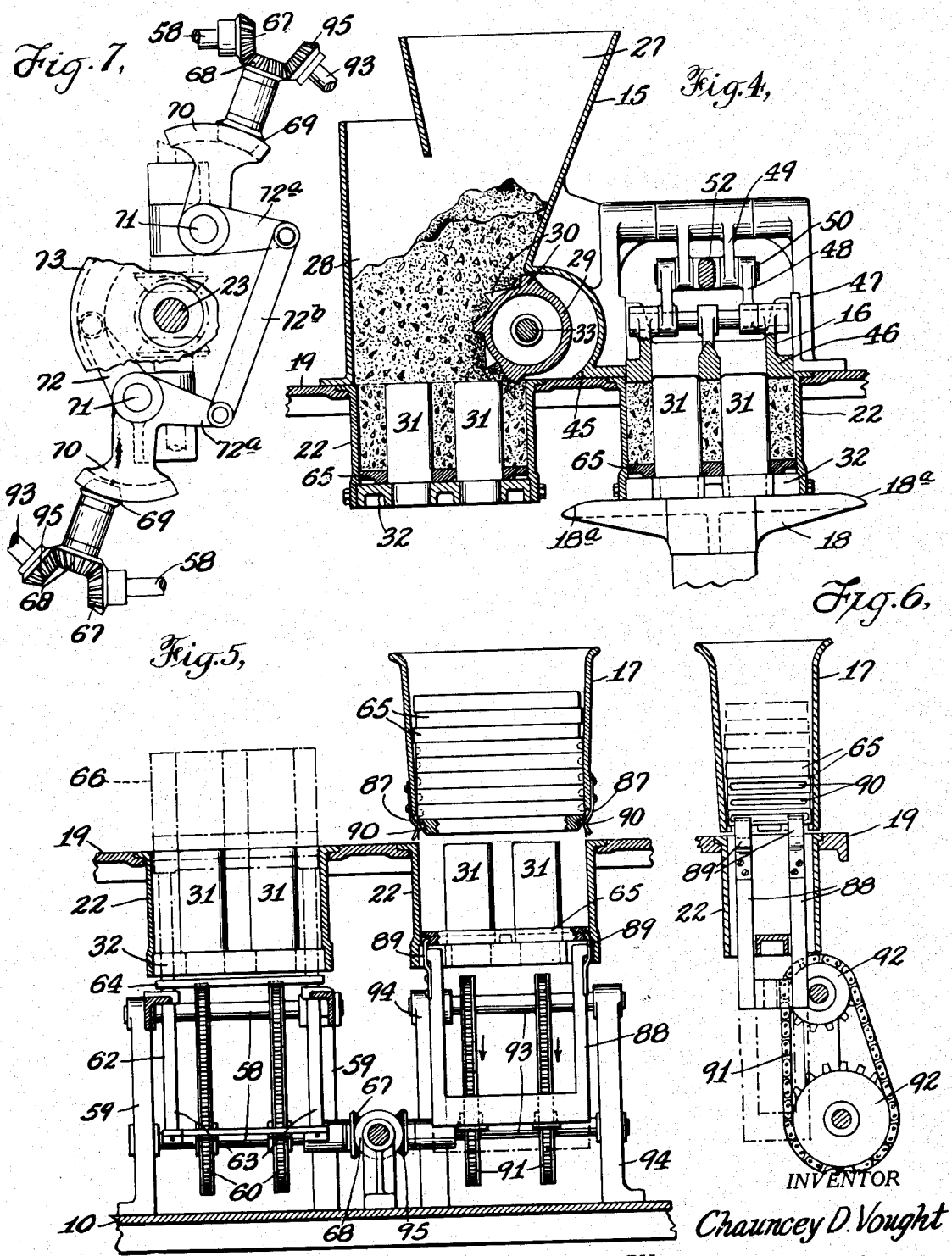

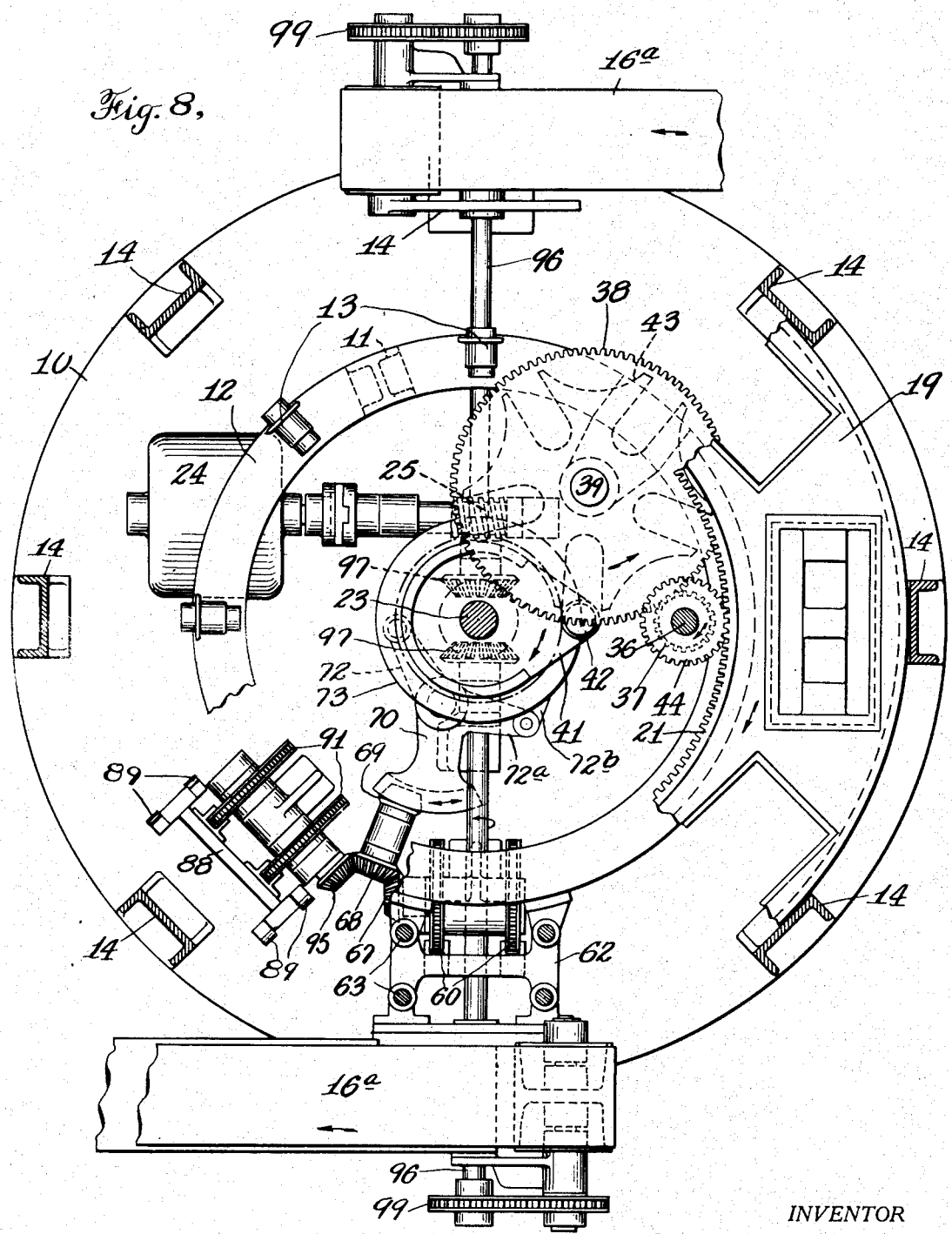

Patented Sept. 7, 1926.

1,599,151

UNITED STATES PATENT OFFICE.

CHAUNCEY D. VOUGHT, OF NEW ROCHELLE, NEW YORK.

MOLDING MACHINE.

Application filed July 1, 1924, Serial No. 723,542. Renewed May 8, 1926.

This invention relates to molding machines and particularly to machines of this class designed for use in molding bricks or blocks of concrete or any other suitable material; and the object of the invention is to provide a machine of the class specified, the construction of which is such as to permit of the molding of two or more bricks or blocks at one time with means for performing a plurality of different operations in the formation of the bricks or blocks at the same time that two or more of such blocks are formed, thus providing a machine by means of which continuous brick or block production may be effected; a further object being to provide means for moving the brick or block forming elements into different positions in the production of brick or blocks thereby, and further to the provision of means for ejecting the blocks from the machine onto a conveyor or conveyors; a further object being to provide a machine of the class specified with vertically arranged cores in the block forming elements thereof and with means for compressing or packing the cement or other material employed compactly around the cores in the formation of bricks or blocks, and whereby substantially perfect bricks or blocks are formed and of corresponding dimensions; a further object being to provide novel means of feeding concrete or other material into the molds prior to being compressed or packed, together with means for inserting pallets into the molds and also means for removing said pallets with the bricks or blocks thereon into position to be ejected by automatically actuated ejector means; and with these and other objects in view, the invention consists in a machine of the class specified all of the mechanisms of which are automatically actuated, thus effecting a material saving in labor and production costs, and one form of machine for carrying my invention into effect is hereinafter more fully described and claimed.

The invention is fully disclosed in the following specification, of which the accompanying drawing forms a part, in which the separate parts of my improvement are designated by suitable reference characters in each of the views, and in which:

Fig. 1 is a plan view of my improved machine.

Fig. 2 is a partial section on the angularly disposed line 2—2 of Fig. 1.

Fig. 3 is a partial section on the line 3—3 of Fig. 1.

Fig. 4 is a partial section on the line 4—4 of Fig. 1.

Fig. 5 is a partial section on the line 5—5 of Fig. 1.

Fig. 6 is a detail view of a part of the construction shown in Fig. 5.

Fig. 7 is a diagrammatic view of certain gearing mechanism employed in the machine; and, Fig. 8 is a diagrammatic sectional plan of the machine, the section being partially on the line 8—8 of Fig. 2.

In the drawing, I have shown for the purpose of illustrating one use of my invention a frame comprising a base plate 10, having a plurality of spaced standards 11, upon which is mounted a ring-like member 12 of channel formation in cross section, see Fig. 2, and upon the member 12 are supported a plurality of anti-friction rollers 13, spaced circumferentially thereof. A plurality of other standards 14 are employed outwardly of the standards 11, the last named standards serving to support two oppositely disposed concrete feeding hoppers 15, oppositely disposed compressor member 16 and the frames therefore, oppositely disposed bearing members and driving means for conveyors 16ª and oppositely disposed pallet feeding hoppers 17. The standards 11 and 14 are connected at opposite points by horizontal platforms 18, one of which is shown in Fig. 2.

Mounted and rotatable on the rollers 13 is a revolving platform 19 in the form of a ring having a comparatively wide horizontal face and a depending circular flange 20, which operates on the rollers 13. The platform 19 is provided with an internal gear 21, by means of which the same may be rotated through mechanisms later described, and countersunk in the top face of the platform 19, and equally spaced circumferentially thereof, are a plurality of mold members or boxes 22, which are of predetermined form in cross section and which are open at the top and bottom. Eight of the mold members 22 are shown in the accompanying drawing, and these members, in the movement of the platform, are adapted to be moved successively into positions to register and cooperate with all of the hoppers employed as well as the packing members, and ejectors, and conveyors as hereinafter set out.

Mounted centrally of the base 10 is an upstanding main shaft 23, having a top bearing in a transverse frame member 14ª, and which may be rotated by any suitable means, but which in the construction shown, is driven by an electric motor 24 through a worm 25 and worm gear 26. The several mechanisms of the machine are all driven directly or indirectly through the main shaft 23 in accomplishing this end, and starting with the concrete inserting means of the machine, the power transmission and structural details of the several mechanisms are as follows:—

The concrete receiving and discharging hoppers 15 are each composed of casings which project above the platform 19 and are provided with conically shaped admission ends 27 which open into chambers 28 at the bottom of said casings, which chambers are positioned directly above the top of the mold members 22 positioned therebeneath. Rotatably mounted in the casing of said hoppers are concrete feeding and packing drums 29 having about one side of the periphery thereof, spaced projecting members 30 adapted to enter predetermined spaces between and around the cores 31 of the molds 22, said cores being supported by members 32 secured to the bottom of the molds. The members 30 of the drums are adapted to fit between the side faces of the cores and the molds as well as between the end faces thereof, and said molds to compress, to a degree, the concrete in the molds. The drums 29 have shafts 33 which project through the inner sides of the casings, and mounted on the inner ends of said shafts are gears 34 which are in common alinement and which mesh with a gear 35 mounted on a supplemental shaft 36, supported in connection with the frame member 12; it will be noted in Fig. 1 of the drawing that one of the shafts 33 is considerably longer than the other shaft. The supplemental shaft 36 is rotated, to accomplish the above operation, through a pinion 37 on said shaft meshing with a gear 38 on another supplemental shaft 39, said last named shaft being provided with a geneva 40, and a geneva crank 41 mounted on the main shaft and cooperating with said geneva to impart intermittent rotary movement to both of the shafts 39 and 36. The geneva crank 41 is provided with a roller 42 adapted to register with the radial apertures 43 of the geneva in the usual manner.

From the foregoing, it will be apparent that the concrete is first passed into the molds 22 located therebeneath, and in the intermittent rotation of the platform 19 through the pinion 44 on the shaft 36 meshing with the gear 21, all of the molds are advanced into the next position. In other words, the molds with the concrete placed therein are moved into position beneath the compressing or packing members 16, in which operation the concrete is partially packed in the molds by the drums 29, the top faces of the molds cleared off or wiped by the comparatively sharp edge 45 in the casing of the hoppers 27. When the molds with the concrete therein are beneath the members 16, said members are actuated, and in the construction shown, the members 16 comprise plates 46 fashioned to conform with the shape of the spaces within the molds and around the core pieces 31 thereof, the plates being guided by frame members 47 positioned therearound and above the platform 19 and being operated through levers 48 and 49, said levers being pivoted together as shown at 50, and the levers 48 are pivoted to extensions on the plates 46 and the levers 49 are pivoted on a rod 51 positioned centrally and longitudinally above the plates 46, see Figs. 2 and 4, and connected to the pivot 50 of the levers 48 and 49 are operating links 52 actuated by a cam 53 mounted on the shaft 23. The cam 53 is provided on its upper and lower faces with cam grooves 54, in the upper of which the roller 55 of one link operates and a smaller roller 56 of the other link operates in the lower groove. The links 52 are each provided with released springs 57 of sufficient tension to permit of the firm packing of the cement in the molds but preventing breakage to the mechanisms when subjected to abnormal conditions. In the pressing or packing operation, the molds are above the platforms 18 or in other words said molds rest upon said platforms, thus providing a firm and rigid backing therefor in the aforesaid operation, and to permit the free passage of the molds into said platform, the ends thereof are preferably beveled as shown at 18ª.

After the brick or blocks of concrete have been formed in the mold and firmly compressed as above set out, the plates 46 are raised and the next intermittent movement of the platform 19 brings the molds with the bricks or blocks therein into position beneath and in juxtaposition to the ejector mechanisms and the conveyors 16ª. The ejector mechanisms comprise a lifting mechanism and a pushing off or discharge mechanism. The first of said mechanisms comprises two shafts 58 mounted in spaced vertical arrangement and in suitable bearing 59, and on said shafts are mounted two conveyor chains 60, driven through gears 61, see Figs. 3 and 5, the chains 60 being connected by a cross bar 62 mounted thereon and secured thereto, said bar carrying a frame comprising four upwardly directed rods 63 connected in pairs by longitudinal cross bars 64 which pass between the side faces of the cores 31 and the corresponding inner faces of the molds and move the pallet 65 and the concrete bricks or blocks 66 upwardly and slightly above the top of the platform 19 as clearly shown in said figures. The lower shafts 58 above described are given intermittent rotary oscillatory movement by the beveled gears 67 thereon meshing with similar gears 68 on a stub shaft which carries other beveled gears 69, given a rotary oscillatory movement through segmental gears 70 pivoted in suitable bearings at 71 and one of which has an arm 72 provided with an anti-friction roller operating in a cam 73. The cam 73 is mounted on and rotated by the main shaft 23. The segmental gears 70 are also provided with other arms 72$^a$ which are coupled together by a link 72$^b$ whereby the operation of one gear segment by the cam 73 and through the lever 72 is transmitted to the other gear segment as diagrammatically illustrated in Fig. 7 of the drawing. It will be noted that the operation of the conveyor chains 60 and the frame thereon, is an upward and downward intermittent movement, controlled by the cam 73, to move the formed bricks or blocks and the pallets thereof above the top of the platform 19 and to return said frames into their depressed positions.

When the frame of the lifting mechanism above described or the bars 64 thereof are in their raised position, the other ejector mechanism operates to eject or remove the bricks or blocks and pallets from the platform 19. The last named mechanism comprises frame members 74 mounted in connection with the frame member 12 and to which are pivoted levers 75 and 76, the lever 75 having an extension 77 coupled wtih a shorter lever 78 on the pivot of the lever 76 through a link 79, see Fig. 3 of the drawing. The lever 75 is provided at a predetermined distance from the fulcrum therof with an arm 80 having an anti-friction roller 81 operating in a cam 82 whereby the levers 75 and 76 are both actuated. Slidably mounted in the top of the frame members 74 are parallel rods 83 to which are secured transverse crossheads 84 with which the free ends of the levers 75 and 76 are connected through short links 85, and coupled with the outer ends of the rods 83 are cross plates 86 which are adapted to bear upon the bricks or blocks 66 and the pallets 65 in ejecting or moving the same from the platform 19 onto the conveyors 16$^a$. It will be understood that in the proper cycle of operation, both of the plates 86 are moved outwardly through the levers 75 and 76 and the other mechanisms described, and this operation takes place before the bars 64 descend or start to descend out of engagement with the molds 22.

After the above operation has taken place, or in other words, the bricks or blocks have been raised out of the molds and the ejection started or completed, the molds are moved into position to receive other pallets from hoppers 17. The hoppers 17 are substantially box-shaped members open at the top and bottom the lower end portions of which are fashioned to permit of the passage of the pallets therethrough and to retain the pallets in proper position, and spring devices 87 are employed to retain the lowermost pallet as well as the pallets thereabove against displacement. In the operation of placing pallets in the molds, pallet grasping members 88 are moved upwardly through the molds and engage the lowermost pallets in the hoppers, said members 88 having spring arms 89 adapted to enter recess 90 in said pallets, and the members 88 are supported on and operated by chains 91 similar to the chains 60, driven by gears 92 on shafts 93 mounted in suitable bearings 94, the lower shafts 93 having beveled gears 95 cooperating with the gears 68. In other words, the members 88 are actuated through the same driving means as the pallet and block raising means employed, as clearly shown in Figs. 3, 5, 6 and 7 of the drawing. In Fig. 5 of the drawing, one of the members 88 is shown partially lowered in full lines, and indicated completely lowered in dotted lines, it being understood that the members 88 are out of engagement with the molds when the molds are moved relatively thereto.

The conveyors 16$^a$ extend tangentially and in opposite directions from the platform of the machine and are adapted to convey the formed bricks or blocks to kilns or the like as may be desired, wherein blocks may be treated and dried in the usual manner. In the construction shown, the conveyors are driven by the shaft 23 by employing horizontal shafts 96 having at their inner ends, beveled gears 97 meshing with a beveled gear 98 on said shaft and coupling the outer ends of said shafts 96 with the shafts of the conveyors by chain and sprocket constructions 99. It will be understood however, that the conveyors may be independently operated if desired, but it may be preferred to provide operation directly by the machine, in order that the speed of the conveyor may conform with the operation of the machine.

From the foregoing description, it will be apparent that my improved machine comprises pairs of mechanisms oppositely disposed with reference to each other for producing during one complete cycle of operation, two complete bricks or blocks, and in the formation of two bricks or blocks, other bricks or blocks are in the process of formation. In other words, when the machine is first started, by the time two bricks or blocks have been formed and discharged, two other bricks or blocks or the molds therefor are receiving concrete; two other, the concrete is being compressed in the molds; and the pallets on which the blocks are formed, are inserted into two other molds.

It is believed that the operation of my improved machine will be readily understood from the foregoing description and upon a consideration of the drawings, but in order that the operation may be very clear, the following brief description of a cycle of operation is submitted. In the first place, it will be understood that the eight core boxes employed, by virtue of the gearing and geneva mechanisms employed, are given intermittent rotary movement; that is to say, are moved into their several positions and retained in such positions for a period of time, and then given their intermittent movement, said molds being mounted on and carried by the platform 19. First, a pallet is inserted or drawn into oppositely disposed molds by the pallet inserting mechanism above specifically described, the platform 19 intermittently moved to bring the molds with the pallets therein into position beneath the concrete feeding hoppers, and the concrete is dropped by gravity into the molds and around the core pieces 31 supported therein and forming part thereof, after which the molds with the concrete therein will be moved into position beneath the compressors or packers 16 during which operation or movement, the concrete is particularly compressed or packed in the molds by the drums 29, and the concrete scraped from the top of the molds by the edges 45 of the casing of the hoppers 27. When beneath the packers or compressors 16, the blocks are properly formed by the downward movement of the plates 46 thereof, which movement may be controlled and governed by adjustment screws 52ª on the links 52, after which the plates 46 are raised and the cores with the bricks or blocks thus formed are moved into position to be ejected, first by lifting ejectors and second by the pushing-off or discharging ejectors which are timed to start the latter, after the former has reached its uppermost position in order that the pallets may slide freely over the top of the platform 19 and be placed onto the conveyor 16. It will be noted that in the last named operations, before the molds move into their next positions beneath the pallet hoppers 17, the vertical ejectors must first be lowered out of engagement with said molds, and this result is accomplished by the proper timing of the ejector mechanisms with respect to the other operative mechanisms of the machine, and as above stated, the plates 46 must be moved out of the molds, before the molds proceed into their next positions. In this connection, it will be noted that the plates 46 extend downwardly into the tops of the molds a predetermined degree, and by reason of this construction, virtually perfect bricks or blocks are formed, and by proper adjustment and regulation of the several parts of the machine, bricks or blocks of substantially equal dimensions throughout may be produced.

In machines of the class under consideration as hereinbefore constructed and especially machines for continuous or multiple production of bricks or blocks, the same are formed in molds where the cores are supported in horizontal position and the concrete supplied and packed, to a slight degree, in a vertical path. This method of manufacture has been found to be impractical and inefficient in that the proper formation of bricks or blocks cannot, in a commercial way, be effected, the greatest difficulties being the proper packing of the concrete around horizontal molds and the setting of the blocks in kilns or driers where the blocks rest on pallets with the core apertures in a horizontal position.

These objections are avoided with my construction in that the blocks may be firmly packed or compressed under any desired or suitable presure, and in the kiln or drying treatment of the bricks or blocks, the core apertures are in vertical position, and no body of concrete or the like has any bearing or stress on said apertures. It will be understood that while I have shown a machine for producing, at one time, two bricks or blocks, and the partial forming of a number of other bricks or blocks at the same time, that I am not necessarily limited in this respect nor am I limited to the several mechanisms employed or the method of actuating said mechanisms as herein shown and described, and various changes in and modifications of the construction shown and described may be made within the scope of the appended claims without departing from the spirit of my invention or sacrificing its advantages.

Having fully described my invention, what I claim as new and desire to secure by Letters Patent, is:—

1. A machine of the class described comprising a suitable frame, a platform mounted to rotate thereon, a plurality of circumferentially spaced molds mounted on and movable with said platform, a main driven shaft, means for rotating said shaft, a supplemental shaft, and means on the main shaft and supplemental shaft for imparting intermittent rotary movement to the supplemental shaft, and intermeshing gears on said platform and said supplemental shaft.

2. A machine of the class described comprising a suitable frame, a platform mounted to rotate thereon, a plurality of circumferentially spaced molds mounted on and movable with said platform, a main driven shaft, means for rotating said shaft, a supplemental shaft, means on the main shaft and supplemental shaft for imparting intermittent rotary movement to the supplemental shaft, intermeshing gears on said platform and said supplemental shaft, a pallet feeding mechanism comprising a reciprocating conveyor, and means involving a cam on the main shaft and gears actuated thereby for operating the conveyor of said mechanism.

3. A machine of the class described comprising a suitable frame, a platform mounted to rotate thereon, a plurality of circumferentially spaced molds mounted on and movable with said platform, a main driven shaft, means for rotating said shaft, a supplemental shaft, means on the main shaft and supplemental shaft for imparting intermittent rotary movement to the supplemental shaft, intermeshing gears on said platform and said supplemental shaft, a pallet feeding mechanism comprising a reciprocating conveyor, means involving a cam on the main shaft and gears actuated thereby for operating the conveyor of said mechanism, a drum for feeding concrete or the like into the molds, and a rotatable drum in said hopper, said drum being in operative connection with said supplemental shaft.

4. A machine of the class described comprising a suitable frame, a platform mounted to rotate thereon, a plurality of circumferentially spaced molds mounted on and movable with said platform, a main driven shaft, means for rotating said shaft, a supplemental shaft, means on the main shaft and supplemental shaft for imparting intermittent rotary movement to the supplemental shaft, intermeshing gears on said platform and said supplemental shaft, a pallet feeding mechanism comprising a reciprocating conveyor, means involving a cam on the main shaft and gears actuated thereby for operating the conveyor of said mechanism, a drum for feeding concrete or the like into the molds, a rotatable drum in said hopper, said drum being in operative connection with said supplemental shaft, a compressor mechanism involving a cam on the main shaft, and links and toggle levers actuated by said cam.

5. A machine of the class described comprising a suitable frame, a platform mounted to rotate thereon, a plurality of circumferentially spaced molds mounted on and movable with said platform, a main driven shaft, means for rotating said shaft, a supplemental shaft, means on the main shaft and supplemental shaft for imparting intermittent rotary movement to the supplemental shaft, intermeshing gears on said platform and said supplemental shaft, a pallet feeding mechanism comprising a reciprocating conveyor, means involving a cam on the main shaft and gears actuated thereby for operating the conveyor of said mechanism, a drum for feeding concrete or the like into the molds, a rotatable drum in said hopper, said drum being in operative connection with said supplemental shaft, a compressor mechanism involving a cam on the main shaft, and links and toggle levers actuated by said cam, and an ejector mechanism involving an intermittent reciprocating conveyor actuated through a cam on the main shaft and interposing gears.

6. A machine of the class described comprising a suitable frame, a platform mounted to rotate thereon, a plurality of circumferentially spaced molds mounted on and movable with said platform, a main driven shaft, means for rotating said shaft, a supplemental shaft, means on the main shaft and supplemental shaft for imparting intermittent rotary movement to the supplemental shaft, intermeshing gears on said platform and said supplemental shaft, a pallet feeding mechanism comprising a reciprocating conveyor, means involving a cam on the main shaft and gears actuated thereby for operating the conveyor of said mechanism, a drum for feeding concrete or the like into the molds, a rotatable drum in said hopper, said drum being in operative connection with said supplemental shaft, a compressor mechanism involving a cam on the main shaft and links and toggle levers actuated by said cam, an ejector mechanism involving an intermittent reciprocating conveyor actuated through a cam on the main shaft, interposing gears, and a supplemental ejector mechanism involving a cam on the main shaft and a lever operated by said cam.

7. A machine of the class described comprising an intermittently rotatable member, molds on said member and movable therewith and adapted in the intermittent movement of said member, to be brought successively into relative position with predetermined mechanisms; means for feeding pallets into said molds in one position of said member, said pallets being supported by said molds and movable therewith, and means for feeding concrete into the molds and upon said pallets in another position of said member, said last named means involving packing and scraping devices.

8. A machine of the class described comprising an intermittently rotatable member, molds on said member and movable therewith and adapted, in the intermittent movement of said member, to be brought successively into relative position with predetermined mechanism; means for feeding pallets into said molds in one position thereof, said pallets being supported by said molds and movable therewith, means for feeding concrete into the molds and upon said pallets in another position of said member, said last named means involving packing and scraping devices, and means in another position of said member for compressing the concrete in the molds to predetermined size and for reinforcing and backing the molds in this operation.

9. A machine of the class described comprising an intermittently rotatable member, molds on said member and movable therewith and adapted, in the intermittent movement of said member, to be brought successively into relative position with predetermined mechanisms, means for feeding pallets into said molds in one position thereof, said pallets being supported by said molds and movable therewith, means for feeding concrete into the molds and upon said pallets in another position of said member, said last named means involving packing and scraping devices, means in another position of said member for compressing the concrete in the molds to predetermined size and for reinforcing and backing the molds in this operation, and means movable upwardly through the molds for removing the pallet and the concrete block thereon from said molds in ejecting the same from said member in another position of said member.

10. A machine of the class described comprising an intermittently rotatable member, molds on said member and movable therewith and adapted, in the intermittent movement of said member, to be brought successively into relative position with predetermined mechanisms; means for feeding pallets into said molds in one position of said member, said pallets being supported by said molds and movable therewith, means for feeding concrete into the molds and upon said pallets in another position of said member, said last named means involving packing and scraping devices, means in another position of said member for compressing the concrete in the molds to predetermined size and for reinforcing and backing the molds in this operation, means movable upwardly through the molds for removing the pallet and the concrete block thereon from said molds in ejecting the same from said member in another position of said member, and other means movable over the top of said member for engaging said pallet and concrete block for removing the same from said member onto a conveyor.

11. A machine of the class described comprising an intermittently rotatable member, molds on said member and movable therewith and adapted, in the intermittent movement of said member, to be brought successively into relative position with predetermined mechanisms; means for feeding pallets into said molds in one position of said member, said pallets being supported by said molds and movable therewith, means for feeding concrete into the molds and upon said pallets in another position of said member, said last named means involving packing and scraping devices, means in another position of said member for compressing the concrete in the molds to predetermined size and for reinforcing and backing the molds in this operation, means movable upwardly through the molds for removing the pallet and the concrete block thereon from said molds in ejecting the same from said member in another position of said member, other means movable over the top of said member for engaging said pallet and concrete block for removing the same from said member onto a conveyor, said mold supporting member being mounted upon and movable over anti-frictional devices.

12. A machine of the class described comprising an intermittently rotatable member, molds on said member and movable therewith and adapted, in the intermittent movement of said member, to be brought successively into relative position with predetermined mechanisms; means for feeding pallets into said molds in one position of said member, said pallets being supported by said molds and movable therewith, means for feeding concrete into the molds and upon said pallets in another position of said member, said last named means involving packing and scraping devices, means in another position of said member for compressing the concrete in the molds to predetermined size and for reinforcing and backing the molds in this operation, means movable upwardly through the molds for removing the pallet and the concrete block thereon from said molds in ejecting the same from said member in another position of said member, other means movable over the top of said member for engaging said pallet and concrete block for removing the same from said member onto a conveyor, said mold supporting member being mounted upon and movable over anti-frictional devices, and said compressing mechanism including shock absorbing means.

13. A machine of the class described comprising a plurality of molds, means for supporting said molds in spaced relation and for successively moving the same into different positions in the formation of hollow bodies, means in said molds for supporting pallets therein, means in one position of said molds for feeding pallets into said molds, said molds being provided with upwardly directed core pieces and the pallets apertured to pass over said core pieces, means for passing concrete into said molds in another position thereof and for packing the concrete in the molds around said core pieces, means in another position of said molds for compressing the concrete in the molds and around said cores to form sized hollow bodies, ejector mechanism for raising the concrete bodies and said pallets from said molds, said ejector mechanism including parts movable through the molds and around said cores, and means adapted to engage the pallet and concrete body when projected from the molds to remove the same from said member.

14. A machine of the class described comprising a plurality of molds, means for supporting said molds in spaced relation and for successively moving the same into different positions in the formation of hollow bodies, means in said molds for supporting pallets therein, means in one position of said molds for feeding pallets into said molds, said molds being provided with upwardly directed core pieces and the pallets apertured to pass over said core pieces, means for passing concrete into said molds in another position thereof and for packing the concrete in the molds around said core pieces, means in another position of said molds for compressing the concrete in the molds and around said cores to form sized hollow bodies, ejector mechanism for raising the concrete bodies and said pallets from said molds, said ejector mechanism including parts movable through the molds and around said cores, means adapted to engage the pallet and concrete body when projected from the molds to remove the same from said member, and a conveyor onto which the molds and pallets are adapted to be moved by said last named means.

15. A machine of the class described comprising a plurality of molds, means for supporting said molds in spaced relation and for successively moving the same into different positions in the formation of hollow bodies, means in said molds for supporting pallets therein, means in one position of said molds for feeding pallets into said molds, said molds being provided with upwardly directed core pieces and the pallets apertured to pass over said core pieces, means for passing concrete into said molds in another position thereof and for packing the concrete in the molds around said core pieces, means in another position of said molds for compressing the concrete in the molds and around said cores to form sized hollow bodies, ejector mechanism for raising the concrete bodies and said pallets from said molds, said ejector mechanism including parts movable through the molds and around said cores, means adapted to engage the pallet and concrete body when projected from the molds to remove the same from said member, a conveyor onto which the molds and pallets are adapted to be moved by said last named means, and means onto which the molds are adapted to be placed in the operation of compressing the concrete bodies to form a backing and reinforcement therefor.

16. A machine of the class described comprising a plurality of molds, means for supporting said molds in spaced relation and for successively moving the same into different positions in the formation of hollow bodies, means in said molds for supporting pallets therein, means in one position of said molds for feeding pallets into said molds, said molds being provided with upwardly directed core pieces and the pallets apertured to pass over said core pieces, means for passing concrete into said molds in another position thereof and for packing the concrete in the molds around said core pieces, means in another position of said molds for compressing the concrete in the molds and around said cores to form sized hollow bodies, ejector mechanism for raising the concrete bodies and said pallets from said molds, said ejector mechanism including parts movable through the molds and around said cores, means adapted to engage the pallet and concrete body when projected from the molds to remove the same from said member, a conveyor onto which the molds and pallets are adapted to be moved by said last named means, means onto which the molds are adapted to be placed in the operation of compressing the concrete bodies to form a backing and reinforcement therefor, and said compressing means involving shock absorbing mechanism.

In testimony that I claim the foregoing as my invention I have signed my name this 18th day of June 1924.

CHAUNCEY D. VOUGHT.